United States Patent
Chiang

(10) Patent No.: US 9,899,753 B1
(45) Date of Patent: Feb. 20, 2018

(54) CONNECTOR AND ELECTRONIC DEVICE SYSTEM USING THE SAME

(71) Applicant: AMBIT MICROSYSTEMS (SHANGHAI) LTD., Shanghai (CN)

(72) Inventor: Chia-Chin Chiang, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 0 days.

(21) Appl. No.: 15/641,408

(22) Filed: Jul. 5, 2017

(30) Foreign Application Priority Data

May 26, 2017 (CN) .......................... 2017 1 0383802

(51) Int. Cl.
*H01R 11/30* (2006.01)
*H01R 4/00* (2006.01)
*H01R 13/62* (2006.01)
*H02J 7/00* (2006.01)

(52) U.S. Cl.
CPC ........... *H01R 4/54* (2013.01); *H01R 13/6205* (2013.01); *H02J 7/0042* (2013.01); *H02J 2007/0096* (2013.01)

(58) Field of Classification Search
CPC ...... H01R 4/54; H01R 11/30; H01R 13/6205; H02J 7/0042; H02J 2007/0096
USPC .................................. 439/39, 278, 282, 638
See application file for complete search history.

(56) References Cited

U.S. PATENT DOCUMENTS

| | | | | |
|---|---|---|---|---|
| 2007/0072443 A1* | 3/2007 | Rohrbach | .......... | H01R 13/6205 439/39 |
| 2015/0010275 A1* | 1/2015 | DiFonzo | .............. | G02B 6/3817 385/53 |
| 2015/0270669 A1* | 9/2015 | Lin | ......................... | H01R 31/06 439/39 |
| 2015/0333448 A1* | 11/2015 | Wu | .................... | H01R 13/6205 439/39 |
| 2016/0040825 A1* | 2/2016 | Franklin | ................ | F16M 13/02 439/39 |

FOREIGN PATENT DOCUMENTS

| CN | 102109544 A | 6/2011 |
|---|---|---|
| CN | 102227661 A | 10/2011 |

* cited by examiner

*Primary Examiner* — Khiem Nguyen
(74) *Attorney, Agent, or Firm* — ScienBiziP, P.C.

(57) ABSTRACT

The disclosure provides a connector and an electronic device system using the same. The connector includes a first connecting unit, a second connecting unit, a connecting structure and a supporting member. The first connecting unit includes a first body, a first magnetic body and a first conductive assembly mounted on the first body, and the first body has a first fixing portion. The second connecting unit includes a second body, a second magnetic body and a second conductive assembly mounted on the second body. The supporting member includes a supporting body, a second fixing portion and an inserted hole provided on the supporting body. The second magnetic body and the second conductive assembly is corresponding to the first magnetic body and the first conductive assembly respectively. The electronic device system has the functions of anti-collision and noise reduction.

14 Claims, 10 Drawing Sheets

CONNECTOR AND ELECTRONIC DEVICE SYSTEM USING THE SAME

FIELD

The subject matter herein generally relates to the field of connectors and electronic device, and more particularly to a connector and an electronic device system using the same.

BACKGROUND

At present, handheld electronic products, such as tablets, mobile phones, etc., have been widely used in people's daily lives. The handheld electronic products need to be thin and easy to manufacture to meet market demand. An accessory of the handheld electronic product usually sets a dock to expand its additional functions (such as high-power speakers, charging, etc.) to increase the value of the handheld electronic product.

When the appearance of the handheld electronic product changes, the connecting structure connecting the handheld electronic product to the accessories, such as a tablet and a dock, will be changed too. It is necessary to add a suitable limit structure and a suitable guide structure on the tablet computer or the dock to prevent the dock from crashing at the moment the tablet is inserted into the dock. The service life of the tablet and the dock can be reduced because of the crash. If the dock has a speaker, the dock can generate a transient noise at the moment the tablet is inserted into the dock, and the transient noise makes the user feel uncomfortable.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
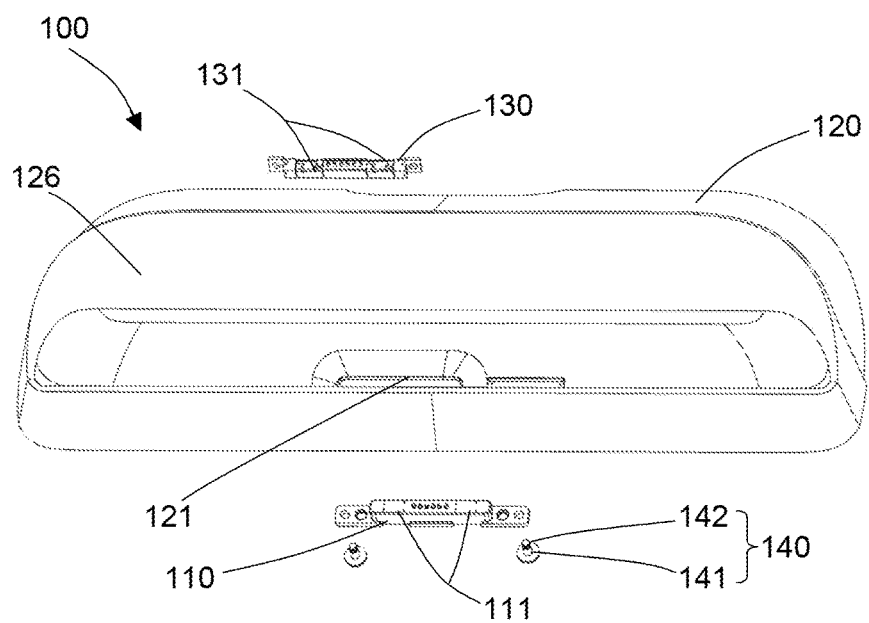
FIG. 1 shows an exploded perspective view of an exemplary embodiment of a connector.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
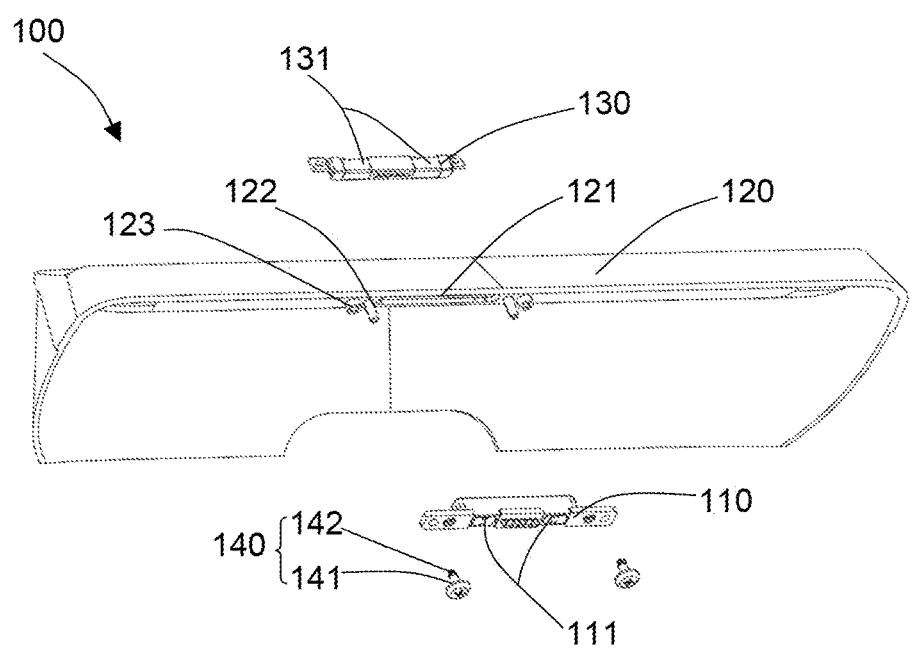
FIG. 2 shows a view of the connector of FIG. 1 at another angle.

FIGS. 1 and 2 show an exemplary embodiment of a connector 100. In FIG. 1, the connector 100 includes a first connecting unit 110, a supporting member 120, a second connecting unit 130 and a connecting structure 140. The supporting member 120 includes a supporting body 126, two second fixing portions 123 and two guide columns 122. The supporting body 126 has an inserted hole 121, and the two second fixing portions 123 and the two guide columns 122 are symmetrically provided on two sides of the inserted hole 121. The guide columns 122 are generally conical in shape. An outer side surface of the guide column 122 is a conical surface. The second fixing portion 123 has a threaded hole (not shown). The connecting structure 140 includes a socket portion 141 and a threaded portion 142, and the socket portion 141 has a substantially smooth cylindrical shape.

In the exemplary embodiment, the supporting member 120 is a housing, and the connecting structure 140 is a screw. The second fixing portion 123 and the guide column 122 are provided on an inner surface of the supporting member 120. The connecting structure 140 is used to movably connects the first connecting unit 110 to the supporting member 120. Specifically, the first connecting unit 110 connects to the supporting member 120 by the engagement of the threaded portion 142 of the connecting structure 140 with the threaded hole (not shown) of the second fixing portion 123. And two sides of the first connecting unit 110 are movably mounted on the socket portions 141.

The first connecting unit 110 includes two first magnetic bodies 111. The second connecting unit 130 includes two second magnetic bodies 131. The first magnetic bodies 111 are corresponding to the second magnetic bodies 131. When the first connecting unit 110 is placed on the supporting body 126 and buckle over the inserted hole 121, the second magnetic bodies 131 attract the first magnetic bodies 111.

Then the first magnetic bodies 111 drives the first connecting unit 110 to move toward the second connecting unit 130 and protrudes from the inserted hole 121. Finally, the first magnetic bodies 111 and the second magnetic bodies 131 are brought into close contact with each other, and the first connecting unit 110 and the second connecting unit 130 are connected together.

The first magnetic body 111 and the second magnetic body 131 are attracted each other. In the exemplary embodiment, the first magnetic body 111 is a magnet, and the second magnetic body 131 is an iron piece coated on the second connecting unit 130. In other embodiments, the first magnetic body 111 and the second magnetic body 131 can be two magnetically opposite magnets.

Figure 3:
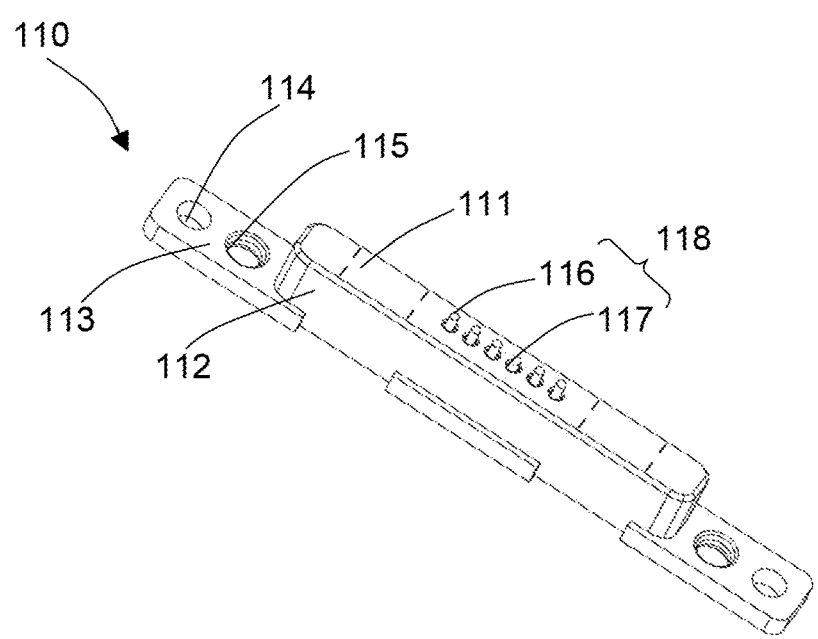
FIG. 3 shows a perspective view of an exemplary embodiment of a first connecting unit.

Referring to FIG. 3, the first connecting unit 110 further includes a first body 112 and two first fixing portions 113. The two first magnetic bodies 111 is mounted on the first body 112. The first body 112 has a first conductive assembly 118 in the middle. The two first fixing portions 113 are symmetrically provided on two sides of the first conductive assembly 118. The two first magnetic bodies 111 are provided between the two first fixing portions 113 and symmetrically mounted on two sides of the first conductive assembly 118. The first fixing portions 113 each have a socket hole 114 and a guide hole 115 adjacent to each other, and an inner wall of the guide hole 115 is an outwardly projecting circular arc surface.

Figure 4:
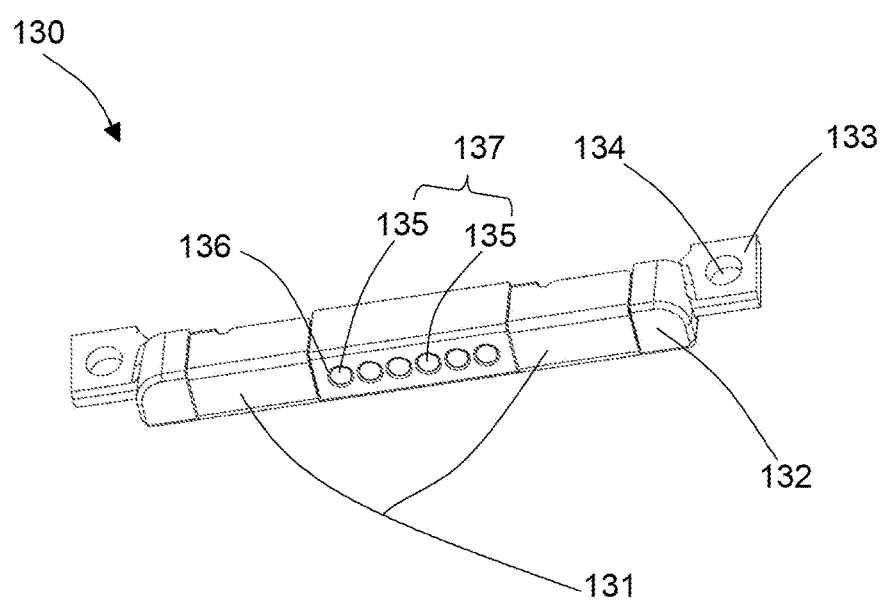
FIG. 4 shows a perspective view of an exemplary embodiment of a second connecting unit.
Figure 5:
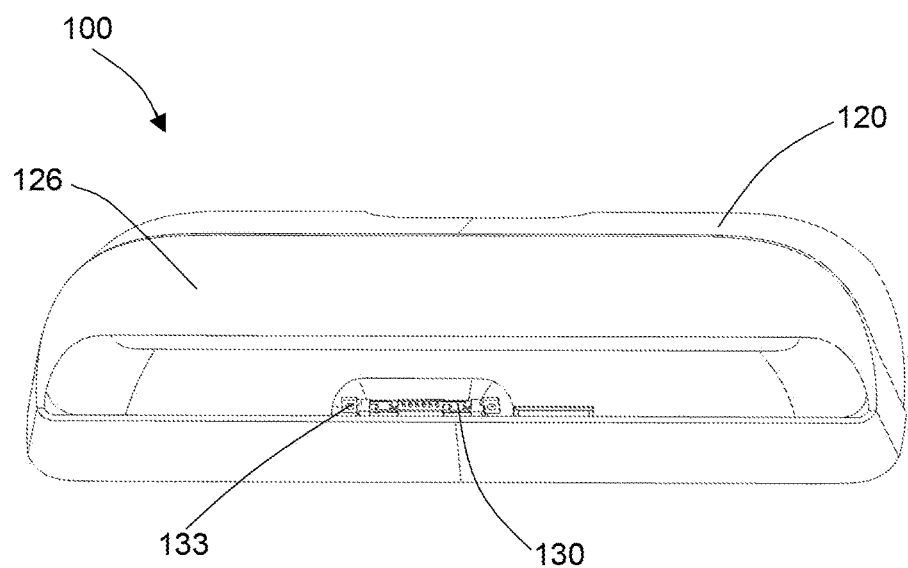
FIG. 5 is shows a perspective view of an exemplary embodiment of the connector.

Referring to FIGS. 3 and 4, the second connecting unit 130 further includes a second body 132 and two third fixing portions 133. The two second magnetic bodes 131 are mounted on the second body 132. The second body 132 has a second conductive assembly 137 in the middle. The second conductive assembly 137 is corresponding to the first conductive assembly 118. The second body 132 has a plurality of mounting holes 136. The second conductive assembly 137 includes a plurality of third conductive units 135 located in the mounting holes 136. The third conductive unit 135 is a cylinder. The third conductive unit 135 has an outer diameter matched with the first conductive unit 116 and the second conductive unit 117.

The two third fixing portions 133 are symmetrically provided on two sides of the second conductive assembly 137. The two second magnetic bodies 131 are provided between the two third fixing portions 133 and are symmetrically mounted on two sides of the second conductive assembly 137. The third fixing portion 133 has a fixing hole 134. The second connecting unit 130 can be mounted on an electronic device by the fixing hole 134 and a screw (not shown).

The installing and working process of the connector 100 is described with reference to FIGS. 1-7.

Referring to FIGS. 2 and 3, when the connector 100 is installed, firstly, the guide holes 115 of the first connecting unit 110 are fitted into the guide columns 122 of the supporting member 120 by a user. Secondly, the threaded portion 142 and the socket portion 141 of the connecting structure 140 is passed through the socket hole 114 of the first connecting unit 110. Finally, the threaded portion 142 is screwed into the threaded hole (not shown) of the second fixing portion 123. After the installation is completed, the socket portion 141 of the connecting structure 140 is not screwed into the threaded hole (not shown) of the second fixing portion 123. The first fixing portion 113 is movably connected to the second fixing portion 123 by the engagement of the socket hole 114 with the socket portion 141. The movement stroke of the first fixing portion 113 can be adjusted through the connecting structure 140.

Figure 6:
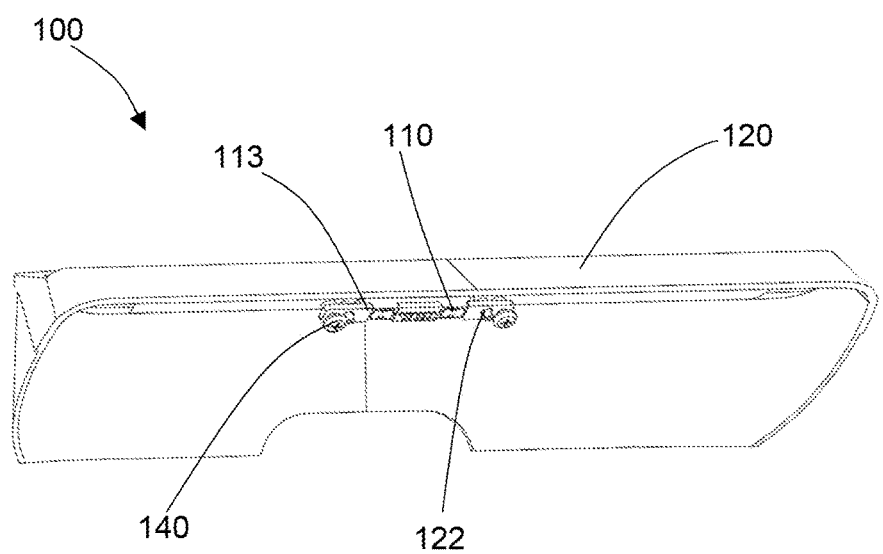
FIG. 6 shows a view of the connector of FIG. 5 at another angle.
Figure 7:
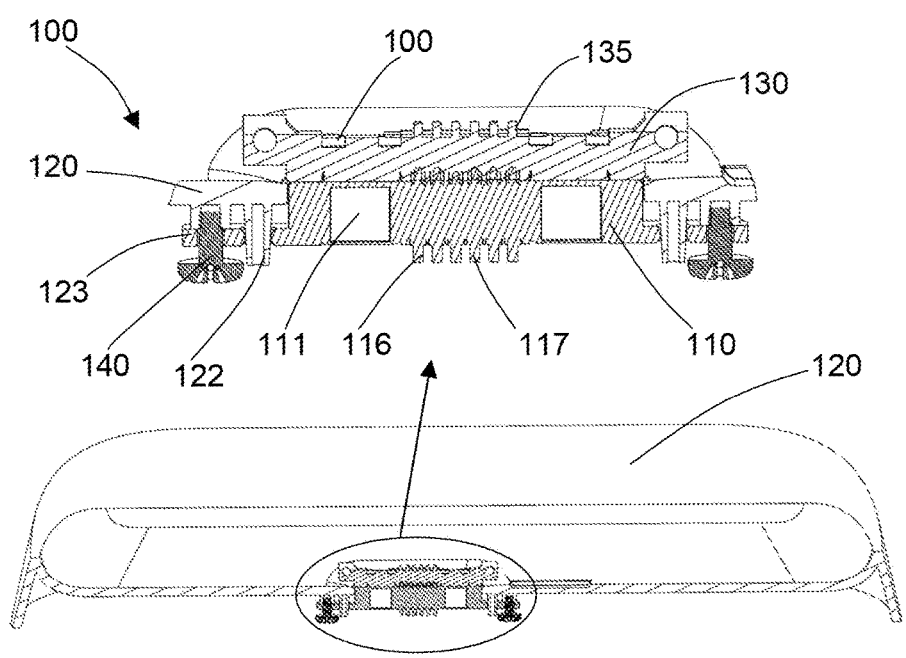
FIG. 7 shows a schematic cross-sectional view of the first connecting unit is engaged with the second connecting unit.

As shown in FIG. 6, the first connecting unit 110 is mounted on the supporting member 120. The connecting structure 140 connects to the supporting member 120 and is locked with the first connecting unit 110. The guide column 122 passes through the guide hole 115, and the first body 112 is located just below the inserted hole 121.

Referring to FIGS. 1, 4, 5 and 7, since the second body 132 of the second connecting unit 130 has the same shape and size as the inserted hole 121, the second body 132 can pass through the inserted hole 121 freely. The third fixing portion 133 extends from two sides of the second body 132 and to form a step structure (not shown) with the second body 132. Thus, when the second connecting unit 130 is placed at the inserted hole 121 of the supporting member 120, the third fixing portion 133 is buckled on the upper surface of the inserted hole 121 of the supporting member 120 by the step structure (not shown) formed by the third fixing portion 133 and the second body 132. The second body 132, the second magnetic body 131 and the second conductive assembly 137 are partly the inserted hole 121.

Due to magnetic attracting effect, the second magnetic body 131 of the second connecting unit 130 attracts the first magnetic body 111 of the first connecting unit 110 when the second connecting unit 130 is placed on the supporting member 120. The first magnetic body 111 drives the first connecting unit 110 to move toward the supporting member 120. The first body 112, the first magnetic body 111 and the first conductive assembly 118 move toward the second connecting unit 130 gradually and protruded out from the inserted hole 121. When the first fixing portion 113 abuts against the second fixing portion 123, the first connecting unit 110 is stop. The first body 112, the first magnetic body 111 and the first conductive assembly 118 partly insert into the inserted hole 121. The first body 112 contacts the second body 132, and the first magnetic body 111 is in close contact with the second magnetic body 131. The first conductive units 116 and the second conductive unit 117 of the first conductive assembly 118 are electrically connected with the third conductive units 135 of the second conductive assembly 137. Thereby, the first connecting unit 110 is electrically connected with the second connecting unit 130.

Figure 8:
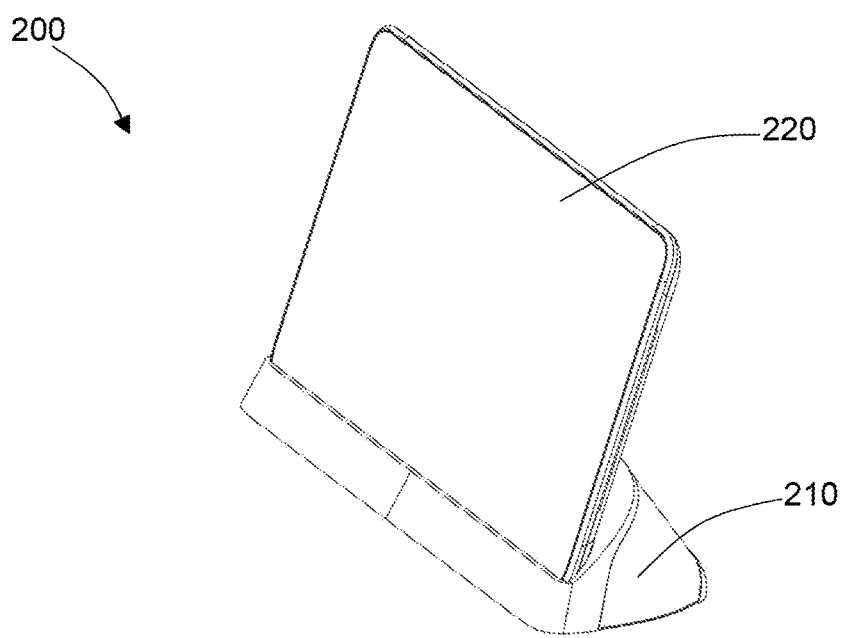
FIG. 8 shows a perspective view of an exemplary embodiment of an electronic device system to which the connector is applied.

Referring to FIG. 8, the disclosure also provides an electronic device system 200 with the connector 100. The electronic combiner 200 includes a first electronic device 210 and a second electronic device 220. In the exemplary embodiment, the first electronic device 210 is a charging seat, and the second electronic device 220 is a mobile phone or a tablet. In other embodiments, the electronic device system 200 may be a portable telephone with a charging seat.

Figure 9:
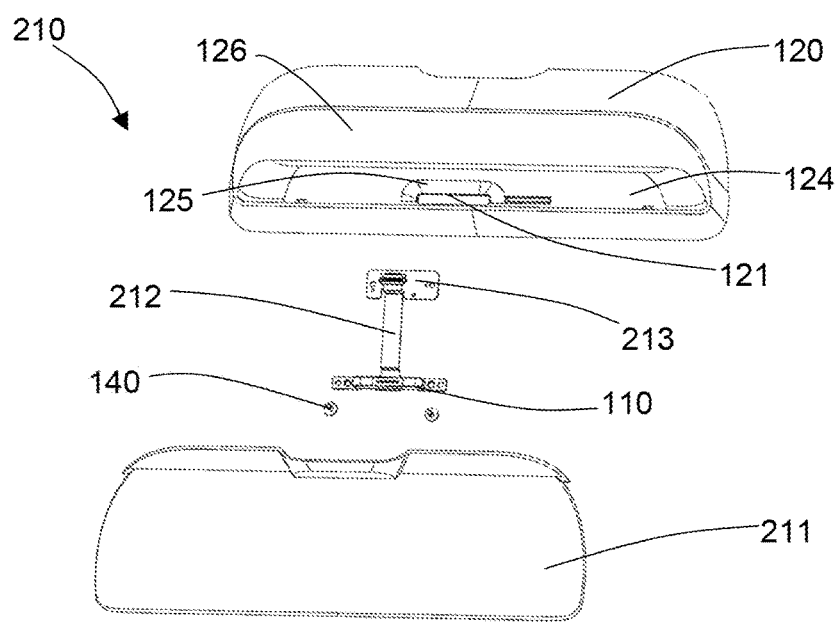
FIG. 9 shows an exploded perspective view of an exemplary embodiment of a first electronic device.

Referring to FIG. 9, the first electronic device 210 includes a supporting member 120, an interface assembly 213, a first circuit board 212, a first connecting unit 110, a connecting structure 140 and a first housing 211. The interface assembly 213, the first circuit board 212, the first connecting unit 110 are connected in order. The interface assembly 213 is mounted on the first housing 211, and the first connecting unit 110 is mounted on the supporting member 120 by the connecting structure 140. The supporting member 120 and the first housing 211 are engaged with each other to form a receiving space. The interface assembly 213, the first circuit board 212 the first connecting unit 110 are received in the receiving space. The interface assembly 213 includes a power interface (not shown).

As shown in FIG. 2, the support member 120 includes a supporting body 126, a placing groove 124 mounted on an upper surface of the supporting body 126, a second fixing portion 123 and a guide column 122 mounted on an inner surface of the supporting body 126, and a plug recess 125 and an inserted hole 121 provided in the placing groove 124. The support member 120 is a housing structure. The inserted hole 121 penetrates the supporting body 126. Two second fixing portions 123 are symmetrically provided on two sides of the inserted hole 121. The two guide columns 122 are provided between the two second fixing portions 123 and are symmetrically provided on two sides of the inserted hole 121. The first connecting unit 110 is movably mounted on the supporting body 126 through the connecting structure 140. The first circuit board 212 is a flexible circuit board. When the first connecting unit 110 is magnetically attracted by the second connecting unit 130 to move relative to the supporting body 126, the first circuit board 212 also moves with the first connecting unit 110.

Figure 10:
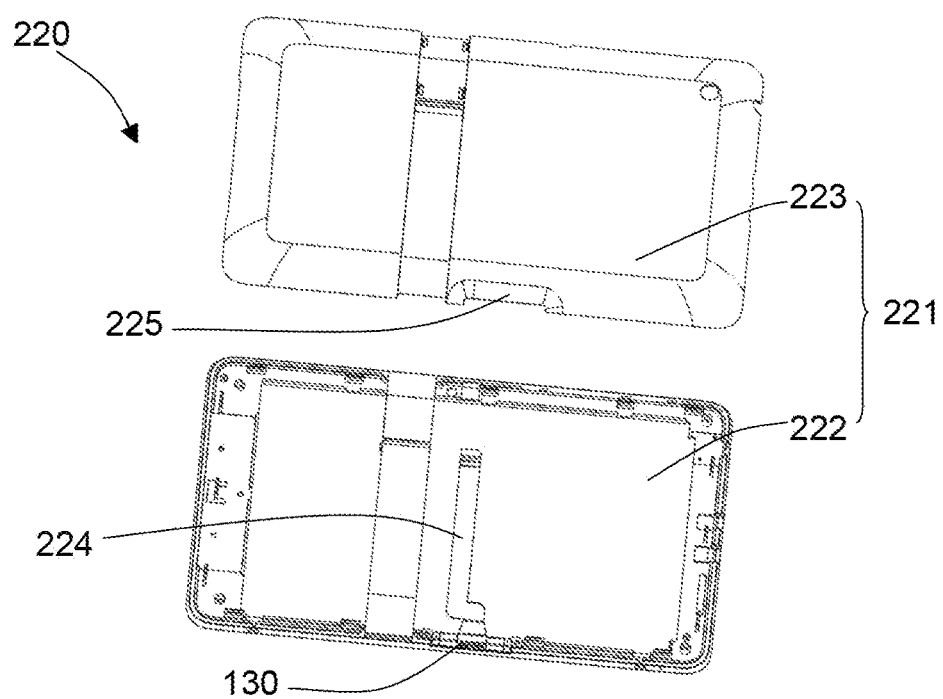
FIG. 10 shows an exploded perspective view of an exemplary embodiment of a second electronic device.

Referring to FIGS. 4 and 10, the second electronic device 220 includes a second housing 221, a second circuit board 224 and a second connecting unit 130 in the second housing 221. The second housing 221 includes an upper case 223 and a bottom case 222 which are engaged with each other. The upper case 223 has a protruding portion 225. The protruding portion 225 is engaged with the plug recess 125 of the supporting body 126. The second circuit board 224 is electrically connected with the second connecting unit 130 and is mounted on the bottom case 222. The second connecting unit 130 has two third fixing portions 133. The second connecting unit 130 is mounted on the bottom case 222 by two fixing holes 134 of the third fixing portions 133 and two screws (not shown). The second connecting unit 130 is corresponding to the protruding portion 225, and the second circuit board 224 is a flexible circuit board. When the upper case 223 is engaged with the bottom case 22, the protruding portion 225 covers the second connecting unit 130. The second body 132, the second magnetic bodies 131, and the second conductive assembly 137 are exposed on the second housing 221.

The working process of the electronic device system 200 is described with reference to FIGS. 1-10.

In operation, firstly, a power supply interface (not shown) of the of the interface assembly 213 is connected with an external power source through a cable (not shown), and the first electronic device 210 is connected to the external power source. Secondly, the protruding portion 225 of the second electronic device 220 aims at the plug recess 125 of the first electronic device 210, and the second electronic device 220 is placed on the placing groove 124. The second electronic device 220 is smoothly placed on the first electronic device 210 by the engagement of the protruding portion 225 and the plug recess 125, and the second connecting unit 130 is located over the inserted hole 121. Thereafter, the second magnetic bodies 131 mounted on the second connecting unit 130 attracts the first magnetic bodies 111 mounted on the first connecting unit 110. With the engagement of the guide holes 115 and the guide columns 122, the first connecting unit 110 moves from the bottom of the socket portion 141 of the connecting structure 140 to the screw portion 142 and moves smoothly toward the second connecting unit 130. Finally, the first connecting unit 110 contacts with the second connecting unit 130. The first conductive units 116 and the second conductive unit 117 of the first conductive assembly 118 is electrically connected with the third conductive units 135 of the second conductive assembly 137. The first connecting unit 110 is electrically connected with the second connecting unit 130, and the first electronic device 210 is electrically connected with the second electronic device 220 so that the first electronic device 210 charges the second electronic device 220.

When the second electronic device 220 is not placed on the first electronic device 210, the first conductive assembly 118 and the first body 112 of the first connecting unit 110 are not exposed from the inserted hole 121 of the placing groove 124. The first conductive assembly 118 and the first body 112 are buckled at the bottom of the socket 141 of the connecting structure 140, and the first body 112 has a distance from the threaded portion 142 of the connecting structure 140. The distance is an active stroke of the first connecting unit 110, and the distance can be adjusted by adjusting the engagement length of the connecting structure 140 and the second fixing portion 123.

After the second electronic device 220 is placed on the first electronic device 210, the first conductive assembly 118 extends slowly from the inserted hole 121 and is electrically connected with the second conductive member 137. In this way, the first conductive assembly 118 and the second conductive assembly 137 are prevented from colliding during the working process. In addition, since the guide column 122 has a tapered shape and an inner wall of the guide hole 115 has an outer convex arc, and the first connecting unit 110 can slid smoothly on the supporting member 120 by the engagement of the guide hole 115 and the guide column 122.

An audio device will produce a blasting sound at the moment the audio device is power-off or power-up. After the audio device is powered on, the operation of the audio device will also produce the blasting sound. The blasting sound is a transient noise. The audio device includes a power amplifier chip, and the power amplifier chip has a mute pin and a power supply pin. If the mute pin connects to power supply first, the power supply pin connects to power supply after a short time, and the audio will not produce the transient noise. The short time is not less than 200 us.

It should be noted that, the length of the second conductive unit 117 is shorter than the length of the first conductive unit 116. Therefore, the first conductive units 116 is electrically contacted with the third conductive units 135 first when the connecting unit 110 moves toward to the second connecting unit 130, and the second conductive unit 117 is electrically contacted with one of the third conductive units 135 after a short period of time. The short period of time is not less than 200 us. The difference between the lengths of the first conductive unit 116 and the second conductive unit 117 is 0.02 mm to 0.32 mm.

In the embodiment, the first electronic device 210 has a speaker and a power amplifier chip connected to the speaker (not shown). The power amplifier chip has a mute pin and a power supply pin (not shown). The mute pin connects to the first conductive unit 116, and the power supply pin connects to the second conductive unit 117. The second conductive unit 117 is electrically connected with a outer power. When the second electronic device 220 is inserted into the first electronic device 210, the first conductive unit 116 contacts a third conductive unit 135 first, and the mute pin of the power amplifier chip is enabled to cause the power amplifier chip to be muted. After a short period of time, the second conductive unit 117 contacts the third conductive unit 135. The power supply pin of the power amplifier chip is electrically connected with the outer power, and the power amplifier chip and the speaker begin to work. As the power amplifier chip has been muted that can not output sound, so that the speaker does not generate a transient noise, and the purpose of eliminating the transient noise is achieved.

The connector 100 and the electronic device system 200 with the connector 100 are provided with a freely movable first connecting unit 110. When the second connecting unit 130 is placed on the first connecting unit 110, the first connecting unit 110 is smoothly adsorbed and electrically connected to the second connecting unit 130. Thereby, the second electronic device 220 is electrically connected with the first electronic device 210. There is no external force in the connection of the first connecting unit 110 and the second connecting unit 130, and the first connecting unit 110 and the second connecting unit 130 do not impact each other by the external force. The connector 100 and the electronic device system 200 are simple and useful. The connector 100 and the electronic device system 200 eliminate the transient noise generated when the first connecting unit 110 is electrically connected to the second connecting unit 130 by providing the first conductive member 116 and the second conductive member 117 of different lengths. The design of the first conductive member 116 and the second conductive member 117 is novel, and the effect of eliminate transient noise is good.

The exemplary embodiments shown and described above are only examples. Many details are often found in the art such as the features of sensor and monitoring system thereof. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A connector, comprising:
    a first connecting unit, comprising a first body, a first magnetic body and a first conductive assembly mounted on the first body, and the first body having a first fixing portion;
    a second connecting unit, comprising a second body, a second magnetic body and a second conductive assembly mounted on the second body, the second magnetic body corresponding to the first magnetic body, and the second conductive assembly corresponding to the first conductive assembly;
    a connecting structure; and
    a supporting member, comprising a supporting body, a second fixing portion and an inserted hole provided on the supporting body;
    wherein the first fixing portion connects to the second fixing portion by the connecting structure to make the first connecting unit connects to the supporting member movably, and the first magnetic body and the first conductive assembly are extended or retracted from the insertion hole freely;
    wherein when the second connecting unit is placed on the supporting body, the first magnetic body is attracted by the second magnetic body to move towards to the second magnetic body, the first magnetic body extends from the inserted hole and contacts with the second magnetic body, and the first conductive assembly extends from the inserted hole and electrically connected with the second conductive assembly.

2. The connector of claim 1, wherein the first conductive assembly comprises a plurality of first conductive units and a second conductive unit provided between the plurality of first conductive units, the second conductive assembly comprises a plurality of third conductive units, and the plurality of first conductive units and the second conductive are corresponding to the plurality of third conductive units.

3. The connector of claim 2, wherein the second conductive unit is shorter than the plurality of first conductive units, the first conductive units is electrically contacted with the third conductive units first when the first connecting unit moves toward to the second connecting unit, and the second conductive unit is electrically contacted with one of the third conductive units after a short period of time.

4. The connector of claim 2, wherein the first conductive unit, the second conductive units, and the third conductive units have a columnar shape.

5. The connector of claim 1, wherein the first connecting unit further comprises a guide hole, the supporting body further comprises a guide column, and the guide hole is engaged with the guide column.

6. The connector of claim 5, wherein an inner wall of the guide hole is a curved surface, the guide column has a conical column shape, and an outer wall of the guide column is a conical surface.

7. The connector of claim 1, wherein the connecting structure comprises a socket portion and a threaded portion integrally formed with the socket portion, the first fixing portion has a socket hole, and the second fixing portion has a threaded hole.

8. The connector of claim 7, wherein the first fixing portion is engaged with the socket portion movably by the engagement of the socket hole and the socket portion, and the connecting structure is mounted on the second fixing portion by the engagement of the threaded portion and the threaded hole.

9. The connector of claim 1, wherein the first magnetic body and the second magnetic body are magnets, or the first magnetic body is a magnet, and the second magnetic body is an iron piece.

10. An electronic device system, comprising:
    a connector comprising:
        a first connecting unit, comprising a first body, a first magnetic body and a first conductive assembly mounted on the first body, and the first body having a first fixing portion;
        a second connecting unit, comprising a second body, a second magnetic body and a second conductive assembly mounted on the second body, the second magnetic body corresponding to the first magnetic body, and the second conductive assembly corresponding to the first conductive assembly;
        a connecting structure; and
        a supporting member, comprising a supporting body, a second fixing portion and an inserted hole provided on the supporting body;
        wherein the first fixing portion connects to the second fixing portion by the connecting structure to make the first connecting unit connects to the supporting member movably, and the first magnetic body and the first conductive assembly are extended or retracted from the inserted hole freely;
        wherein when the second connecting unit is placed on the supporting body, the first magnetic body is attracted by the second magnetic body to move towards to the second magnetic body, the first magnetic body extends from the inserted hole and contacts with the second magnetic body, and the first conductive assembly extends from the inserted hole and connected with to the second conductive assembly electrically;

a first electronic device comprising a first housing and a first circuit board mounted on the first housing, wherein the first circuit board connects to the first connecting unit, and the supporting member connects to the first housing to form a storage space for receiving the first circuit board and the first connecting unit; and a second electronic device comprising a second housing and a second circuit board mounted on the second housing, wherein the second connecting unit is mounted on the second housing and electrically connected to the second circuit board;

wherein when the second electronic device is placed on the first electronic device, the second magnetic body attracts the first magnetic body to make the first connecting unit move towards to the second connecting unit, the first connecting unit contacts with and electrically connected to the second connecting unit, and the first electronic device electrically connects to the second electronic device.

11. The connector of claim 10, wherein the first electronic device or the second electronic device generate a transient noise when the first electronic device electrically connects to the second electronic device, and the transient noise can be eliminated by extending the short period of time.

12. The electronic device system of claim 10, wherein the first circuit board and the second circuit board are flexible circuit boards.

13. The electronic device system of claim 10, wherein the supporting body of the support structure further has a placing groove, the placing groove has a plug recess, and the inserted hole is provided at a bottom of the plug recess and is connected to the plug recess.

14. The electronic device system of claim 10, wherein when the second electronic device is not placed on the first electronic device, the first connecting unit is located on the socket portion away from the threaded portion and is hided in the inserted hole.

\* \* \* \* \*